(12) United States Patent
Schwärzler et al.

(10) Patent No.: US 8,430,758 B2
(45) Date of Patent: Apr. 30, 2013

(54) CONSTANT VELOCITY JOINT WITH SMALL RADIAL MOVEMENTS OF THE BALLS

(75) Inventors: Peter Schwärzler, Glattbach (DE); Heiko Harnischfeger, Freiensteinau-Weidenau (DE)

(73) Assignee: GKN Driveline Deutschland GmbH, Offenbach (DE)

( * ) Notice: Subject to any disclaimer, the term of this patent is extended or adjusted under 35 U.S.C. 154(b) by 1528 days.

(21) Appl. No.: 10/568,897

(22) PCT Filed: Jun. 5, 2004

(86) PCT No.: PCT/EP2004/006086
§ 371 (c)(1),
(2), (4) Date: Mar. 7, 2011

(87) PCT Pub. No.: WO2005/028894
PCT Pub. Date: Mar. 31, 2005

(65) Prior Publication Data
US 2011/0256939 A1 Oct. 20, 2011

(30) Foreign Application Priority Data

Aug. 22, 2003 (DE) .................................. 103 38 718
Feb. 9, 2004 (DE) .......................... 10 2004 006 225

(51) Int. Cl.
*F16D 3/223* (2011.01)
(52) U.S. Cl.
USPC ......................................... 464/145; 464/906

(58) Field of Classification Search .......... 464/140–146, 464/906
See application file for complete search history.

(56) References Cited

U.S. PATENT DOCUMENTS

| 4,950,206 A | 8/1990 | Jacob |
| 4,968,287 A | 11/1990 | Jacob |
| 5,122,096 A | 6/1992 | Aucktor et al. |
| 2004/0116192 A1 | 6/2004 | Krude et al. |

FOREIGN PATENT DOCUMENTS

| DE | 197 06 864 | 6/1998 |
| DE | 103 37 612 | 6/2004 |
| DE | 103 37 918 | 3/2005 |
| FR | 2 799 519 | 4/2001 |

*Primary Examiner* — Gregory Binda
(74) *Attorney, Agent, or Firm* — Rader, Fishman & Grauer, PLLC

(57) ABSTRACT

A constant velocity fixed joint. The center line (M22) of the outer ball tracks (22) towards a first side (S1) departs, radially inwardly, a reference radius centered in the point of intersection between a perpendicular line on tangents (T22) at the center line (M22), and the longitudinal axis (L12). The center line (M23) of the inner ball tracks (23) towards a second side (S2) departs, radially inwardly, a reference radius centered in the point of intersection of a perpendicular line on the tangent at the center line (M23), and the longitudinal axis (L13). In the outer joint part, from the joint center plane (EM) to the second side (S2), the center line (M22) moves beyond the reference radius radially outwardly. In the inner joint part (13), from the joint center plane (EM) to the first side (S1), the center line (M23) moves beyond the reference radius, radially outwardly.

16 Claims, 12 Drawing Sheets

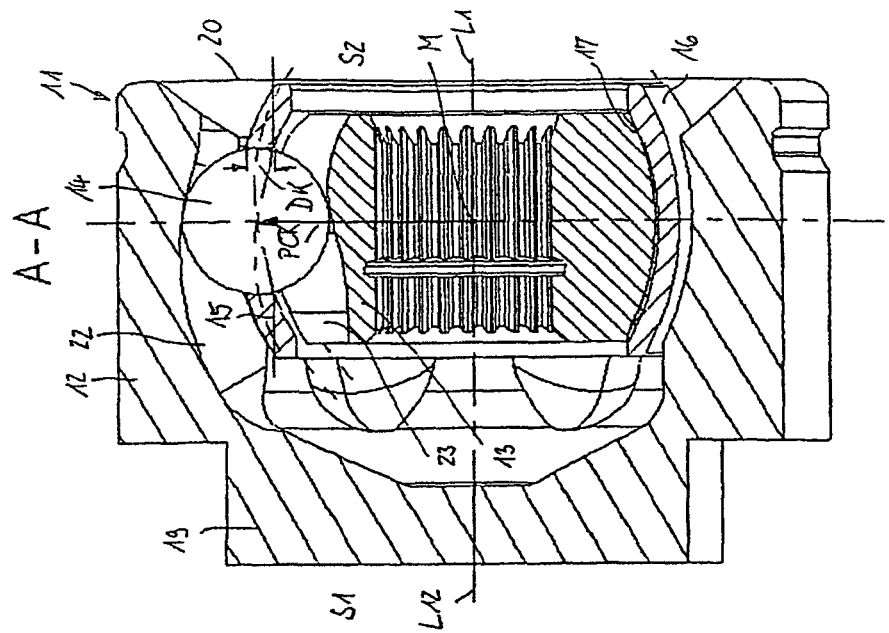
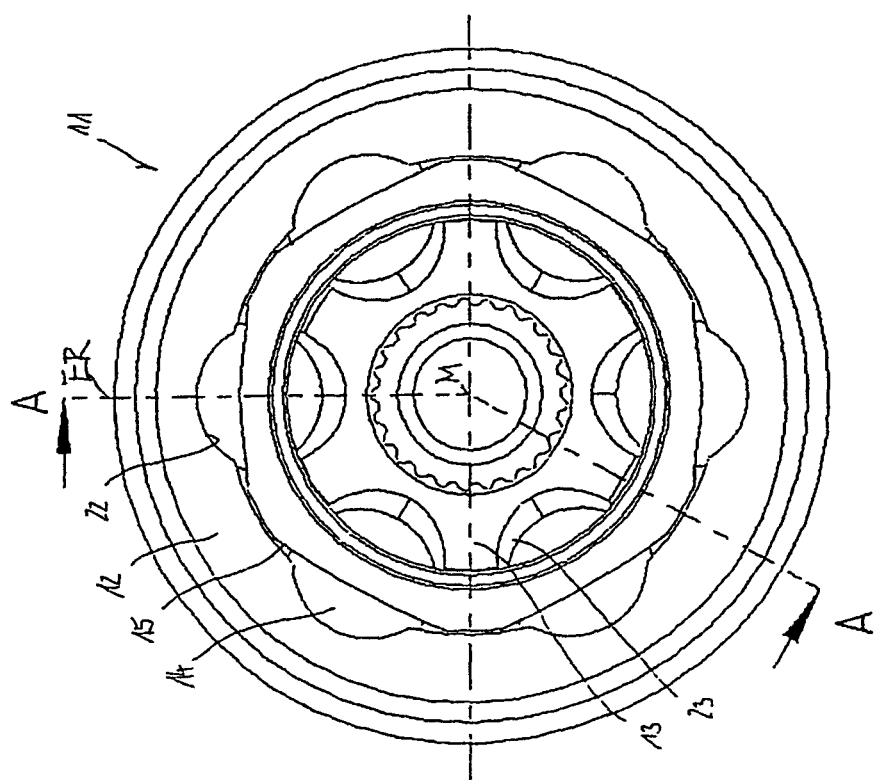
FIG. 2b
FIG. 2a

CONSTANT VELOCITY JOINT WITH SMALL RADIAL MOVEMENTS OF THE BALLS

BACKGROUND

The invention relates to a constant velocity joint in the form of a fixed joint with the following characteristics: an outer joint part which comprises a longitudinal axis and a first side S1 and a second side S2 arranged to as to be axially opposite one another, and which is provided with outer ball tracks; an inner joint part which comprises a longitudinal axis and attaching means for a shaft pointing to an aperture of the outer joint part, and which is provided with inner ball tracks; the outer ball tracks and the inner ball tracks form pairs of tracks with one another; the pairs of tracks each accommodate a torque transmitting ball; an annular ball cage is positioned between the outer joint part and the inner joint part and comprises circumferentially distributed cage windows which each accommodate at least one of the torque transmitting balls; the centers of the balls are held by the cage in a joint center plane and, when the joint is articulated, they are guided onto the angle-bisecting plane between the longitudinal axes.

Because of the way in which the ball tracks of the pairs of tracks in the outer joint part and inner joint part extend, fixed joints in the form of UF joints (undercut-free joints) feature a large radial ball movement when the balls in an articulated joint move to and fro along the ball tracks during a rotation of the joint while the ball tracks of the pairs of tracks—with reference to their starting position—are periodically articulated relative to one another on both sides by the joint articulation angle. The radial ball movement determines the minimum cage thickness of the ball cage, because during their entire radial movement during a rotation of the joint, the balls have to be guided within the cage windows, i.e. they must remain in contact with the circumferential guiding faces of the cage windows.

A large cage thickness necessarily reduces the degree of envelopment of the balls by the ball tracks, if seen in a cross-sectional view through the joint, because an increasing cage thickness leads to a reduction in the track depth of the outer ball tracks and inner ball tracks. A reduction in the track depth and a resulting reduction in the degree of ball envelopment lead to a decrease in the torque transmitting capacity of the joint.

U.S. Publication No. 2004/0116192 proposes constant velocity fixed joints wherein the opening angle α between tangents at balls in contact points with the ball tracks in the joint center plane when the joint is in the aligned condition with coinciding longitudinal axes, opens from the aperture end to the attaching end. There are given different track shapes which also include approximately S-shaped track center lines with a turning point in the outer joint part and in the inner joint part. The track center lines are defined as the path of the centers of the balls in the ball tracks. The strength of the outer joint part is to be increased with the help of the opposed orientation of said opening angle α—as compared to the UF joints—when the joint is in the aligned condition.

It is the object of the present invention to propose a fixed joint of the above-mentioned type whose torque transmitting capacity is increased further.

SUMMARY OF THE INVENTION

A first solution provides a constant velocity joint in the form of a fixed joint having: an outer joint part which comprises a longitudinal axis L12 and a first side S1 and a second side S2 arranged so as to be axially opposite one another, and outer ball tracks; an inner joint part which comprises a longitudinal axis L13 and an attaching mechanism for a shaft pointing to an aperture of the outer joint part, and inner ball tracks, the outer ball tracks and the inner ball tracks form pairs of tracks with one another, the pairs of tracks each accommodate a torque transmitting ball; and an annular ball cage positioned between the outer joint part and the inner joint part and comprising circumferentially distributed cage windows which each accommodate at least one of the torque transmitting balls. The centers of the balls are held by the cage in a joint center plane (EM) and, when the joint is articulated, they are guided onto the angle-bisecting plane between the longitudinal axes L12, L13. The center lines M22, M23 of the ball tracks of pairs of tracks are positioned in radial planes ER extending through the joint, wherein the center lines M22, M23 of pairs of tracks are substantially mirror-image-like with reference to the joint center plane EM. The opening angle α between tangents T22', T23 at track base lines which extend parallel to tangents T22, T23 at the center lines M22, M23 of the ball tracks in the joint center plane EM opens from the aperture side to the attaching side when the joint is in the aligned condition, with coinciding longitudinal axes. In the outer joint part, in the region from the joint center plane EM to the first side S1, the center line M22 of the ball track departs, radially inwardly, a reference radius RB whose radius center MB is positioned in the point of intersection of a perpendicular line on the tangent T22 at the center line M22 of the ball track in the joint center plane, and of the longitudinal axis. In the inner joint part, in the region from the joint center plane EM to the second side S2, the center line M23 of the ball tracks departs, radially inwardly, a reference radius RB' whose radius center MB' is positioned in the point of intersection of a perpendicular line on the tangent T23 at the center line M23 of the ball track in the joint center plane and of the longitudinal axis. In the outer joint part, the center line M22 of the ball tracks moves in the region from the joint center plane EM to the second side S2 radially outwardly beyond said reference radius RB. In the inner joint part, the center line M23 of the ball tracks moves in the region from the joint center plane EM to the first side S1 radially outwardly beyond said reference radius RB'.

The track shape given here permits a reduction in the radial ball movement as compared to prior art track shapes. Said reduction in the ball movement can be converted into a reduction in the cage thickness in the region of the cage windows and thus into a higher rate of envelopment of the balls by the ball tracks, with the latter directly leading to an increase in the torque transmitting capacity of the joint. The first feature, according to which the center lines leave the reference radii inwardly, can start directly at the joint center plane or at a later stage and more particularly, it can behave so as to increase progressively. The second feature according to which the center lines move outwardly beyond the reference radius includes a direct outward movement away from the reference radius, as well as a later crossing of the reference radius and a subsequent movement towards the outside.

BRIEF DESCRIPTION OF THE DRAWINGS

The invention will be explained in greater detail with reference to the drawings which illustrate preferred embodiments of inventive joints as compared to a joint according to the state of the art.

FIG. 2 is an inventive joint according to FIG. 1:
  a) in an axial view, and
  b) in a longitudinal section.

DETAILED DESCRIPTION OF THE DRAWINGS

Before turning to the drawings in detail, further aspects of the invention are highlighted herein. Starting from the first solution (FIGS. 1 and 2) set forth above, in the outer joint part, the local radius of curvature R1 of the center line M22 in the joint center plane EM can be smaller than the reference radius RB (FIG. 8b); and in the inner joint part, the local radius of curvature R1' of the center line M23 in the joint center plane EM can be smaller than the reference radius RB' (FIG. 8b).

Figure 8A:
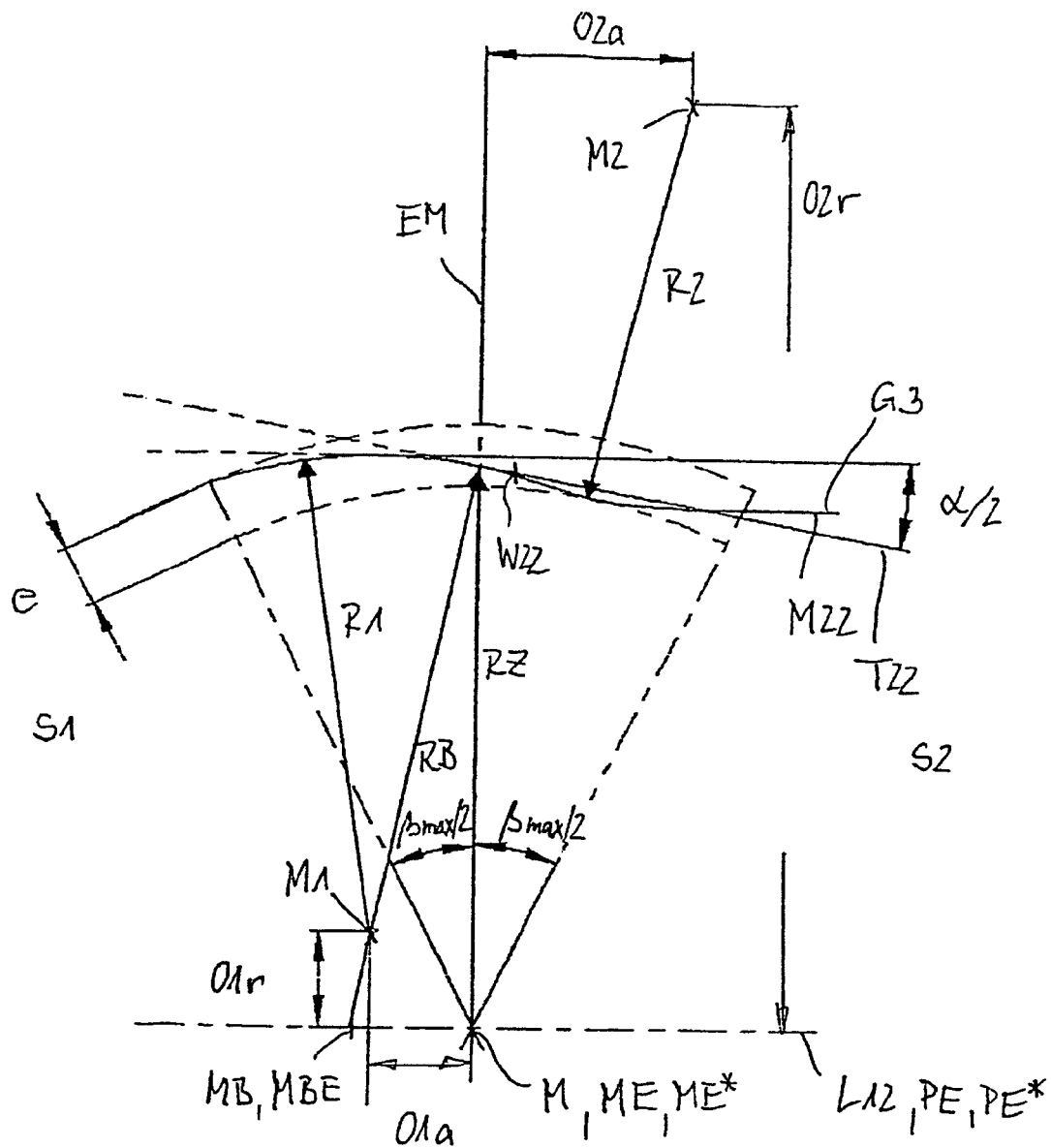
FIG. 8 shows the longitudinal axes and the track center lines of the inventive joints of FIGS. 1-6:
  a) for the outer joint part, and
  b) for the inner joint part.
Figure 8B:
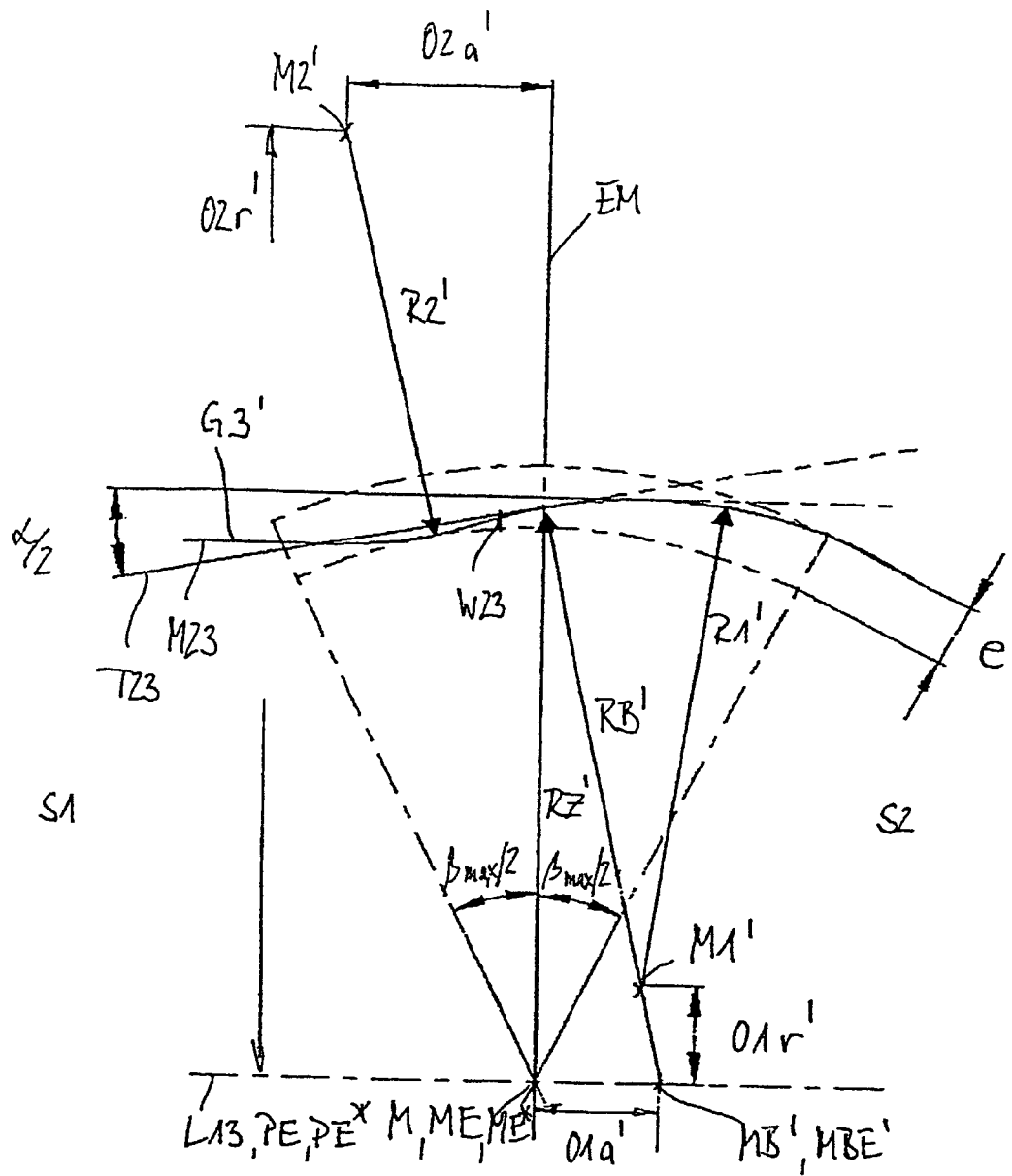

According to a further embodiment, in the outer joint part, the center line M22 of the ball tracks extends from the joint center plane EM to the first side S1 radially outside a reference radius RZ whose radius center is positioned in the joint center M (FIG. 8a); and in the inner joint part, the center line M23 of the ball tracks extends from the joint center plane EM to the second side S2 radially outside a reference radius RZ' whose radius center is positioned in the joint center M (FIG. 8b).

A further advantageous embodiment provides that, in the outer joint part, the center line M22 of the ball tracks extends from the joint center plane EM to the second side S2 radially outside the reference radius RB (FIG. 8a); and in the inner joint part, the center line M23 of the ball tracks extends from the joint center plane EM to the first side S1 radially outside the reference radius RB' (FIG. 8b).

In still a further embodiment, in the outer joint part, the center line M22 of the ball tracks extends from the joint center plane EM to the second side S2 radially inside a reference radius RZ around the joint center M (FIG. 8a); and in the inner joint part, the center line M23 of the ball tracks extends from the joint center plane EM to the first side S1 radially inside the reference radius RZ' around the joint center M (FIG. 8b).

According to yet a further embodiment shown in FIGS. 8a and 8b, the center lines M22, M23 of the outer ball tracks and inner ball tracks each comprise at least two arched portions which are curved in opposite directions and which adjoin one another in a turning point. The turning points W22 of the outer ball tracks are positioned at a distance from the center plane EM towards the second side S2. The turning points W23 of the inner ball tracks are positioned at a distance from the center plane EM towards the first side S1. The turning points are positioned below a maximum of the distance of the center lines M22, M23 from the longitudinal axes L12, L13.

A further embodiment provides that the track center lines M22 of the outer ball tracks comprise a first arch with the radius R1 whose center M1 is offset by a first axial offset O1a from the center plane EM of the joint towards the first side S1 and by a first radial offset O1r from the longitudinal axis L12 towards the ball track, and in the region adjoining said arch, towards the second side S2, they comprise a second arch with the radius R2 whose center M2 is offset by a second axial offset O2a from the center plane EM of the joint towards the second side S2 and by a second radial offset O2r, which is greater than the sum of the first radius R1 and the first radial offset O1r, from the longitudinal axis L12 towards the outside (FIG. 8a). The track center lines M23 of the inner ball tracks comprise a first arch with the radius R1' whose center M1' is offset by a first axial offset O1a' from the center plane EM of the joint towards the second side S2 and by a first radial offset O1r' from the longitudinal axis L13 towards the ball track, and in the region adjoining said arch, towards the first side S1, they comprise a second arch with the radius R2' whose center M2' is offset by a second axial offset O2a' from the center plane EM of the joint towards the first side S1 and by a second radial offset O2r', which is greater than the sum of the first radius R1' and the first radial offset O1r', from the longitudinal axis L13 towards the outside (FIG. 8b).

Furthermore, the local radius of curvature of the center lines M22 of the outer ball tracks can decrease in the extension of the center lines from the center plane EM to the first side S1 and the local radius of curvature of the center lines M23 of the inner ball tracks can decrease in the extension of the center lines from the center plane EM to the second side S2.

Figure 9A:
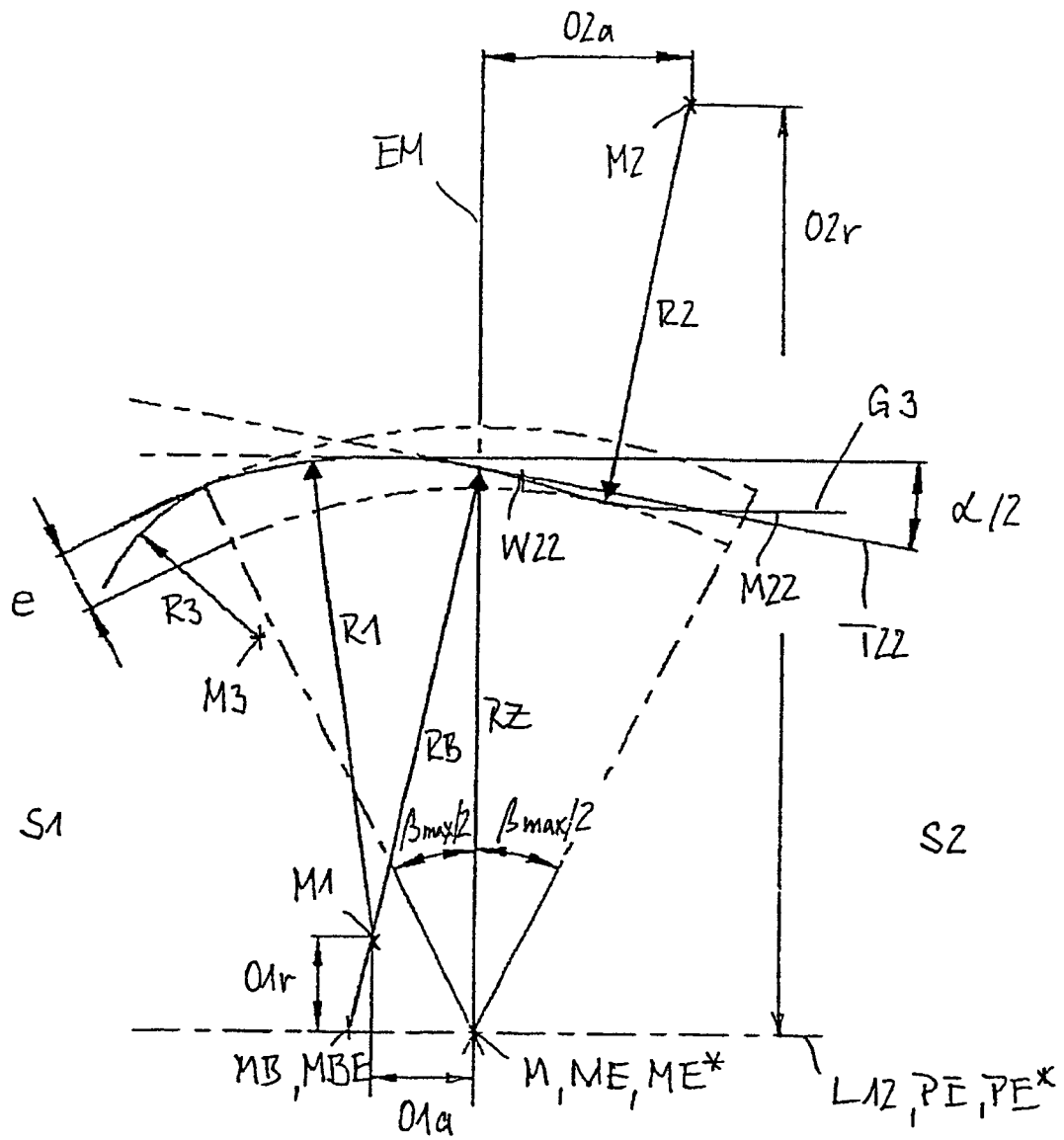
FIG. 9 shows the longitudinal axes and the track centre lines of the inventive joints in another embodiment:
  a) for the outer joint part, and
  b) for the inner joint part.
Figure 9B:
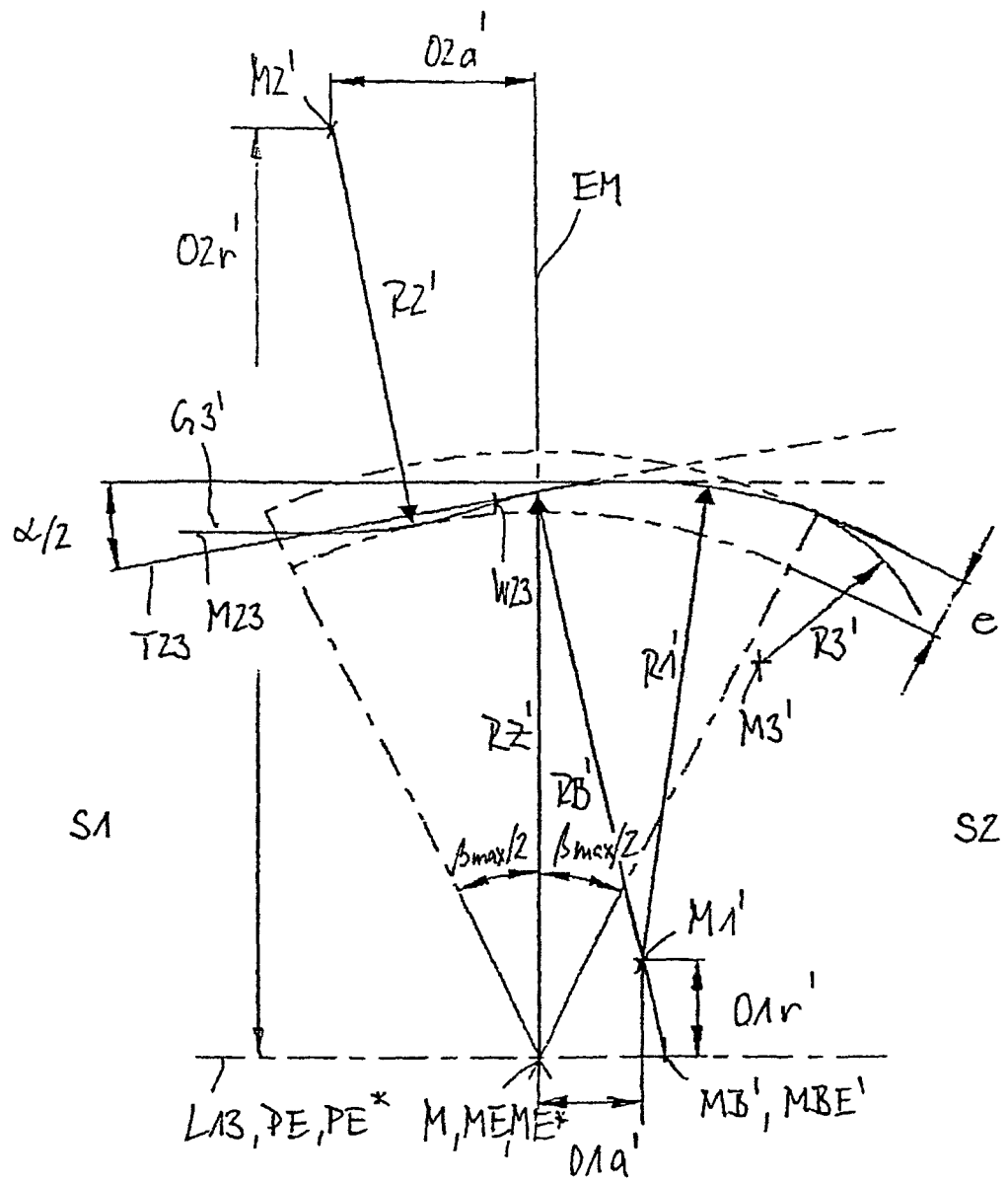

More particularly, the track center lines M22 of the outer ball tracks can comprise a third arch with the radius of curvature R3 which, tangentially, while having the same sense of curvature, adjoins the first arch with the radius of curvature R1 and whose radius of curvature R3 is smaller than the radius of curvature R1 (FIG. 9a). The track center lines M23 of the inner ball tracks can also comprise a third arch with the radius of curvature R3' which, tangentially, while having the same sense of curvature, adjoins the first arch with the radius of curvature R1' and whose radius of curvature R3' is smaller than the radius of curvature R1' (FIG. 9b).

According to a further aspect, along the extension of the center line M22 of the outer ball tracks towards the second side S2, the second arch is adjoined by an axis-parallel straight line G3 (FIG. 8a), and along the extension of the center line M23 of the inner ball tracks, the second arch, towards the first side S1, is adjoined by an axis-parallel straight line G3' (FIG. 8b).

According to an alternative embodiment, along the extension of the center line M22 of the outer ball tracks towards the second side S2, the second arch is adjoined by a straight line which approaches the longitudinal axis, and along the extension of the center line M23 of the inner ball tracks, the second arch, towards the first side S1, is adjoined by a straight line which approaches the longitudinal axis.

In accordance with these characteristics, the center lines M22, M23 of the ball tracks in the joint center plane intersect one another at an angle of 4 to 32°, and the tangents T22', T23' at the track base lines of the ball tracks of all pairs of tracks form identical opening angles α when the joint is in the aligned condition.

According to one embodiment, the track shape is such that the radial movement (e) of the balls along the ball tracks, over the entire angular range+$\beta_{max}$/2, is limited to the value of e<0.06×$\beta_{max}$×PCR, with $\beta_{max}$ being the maximum operating angle of the joint in the arch dimension and PCR being the pitch circle diameter of the joint. In this way, it is possible to observe a small cage thickness and great track depths. The latter lead to large ball enveloping angles γ22, γ23 and thus to a high torque transmitting capacity of the joint.

FIG. 3 shows a second solution which provides a constant velocity joint in the form of a fixed joint. The joint includes an outer joint part which comprises a longitudinal axis L12 and a first side S1 and a second side S2 arranged so as to be axially opposite one another, and outer ball tracks. The inner joint part has a longitudinal axis L13 and an attaching mechanism for a shaft pointing to an aperture of the outer joint part, and inner ball tracks. The outer ball tracks and the inner ball tracks form pairs of tracks with one another, the pairs of tracks each accommodate a torque transmitting ball. An annular ball cage is positioned between the outer joint part and the inner joint part and comprises circumferentially distributed cage windows which each accommodate at least one of the torque transmitting balls. The centers of the balls are held by the cage in a joint center plane EM and, when the joint is articulated, they are guided onto the angle-bisecting plane between the longitudinal axes L12, L13. The center lines M22, M23 of the ball tracks of pairs of tracks are positioned in pairs of track planes BE, BE* which extend substantially symmetrically and parallel relative to radial planes ER through the joint. The center lines M22, M23 of the pairs of tracks are substantially mirror-image-like with reference to the joint center plane EM. The opening angle α between tangents T22', T23' at track base lines which extend parallel to tangents T22, T23 at the center lines M22, M23 of the ball tracks in the joint center plane EM opens from the second side S2 to the first side S1 when the joint is in the aligned condition, with coinciding longitudinal axes L12, L13.

In the outer joint part, in the region from the joint center plane EM to the first side S1, the center line M22 of the ball tracks radially inwardly and departs from a reference radius RB whose radius center MBE is positioned in the point of intersection of a perpendicular line on the tangent T22 at the center line M22 of the ball track in the joint center plane EM and of a parallel axis PE, PE* extending parallel to the longitudinal axis L12 through a track plane BE, BE*.

In the inner joint part, in the region from the joint center plane EM to the second side S2, the center line M23 of the ball tracks radially inwardly and departs from a reference radius RB' whose radius center MBE' is positioned in the point of intersection of a perpendicular line on the tangent T23 at the center line M23 of the ball track in the joint center plane EM and of a parallel axis PE, PE* extending parallel to the longitudinal axis L13 through a track plane BE, BE*.

In the outer joint part, the center line M22 of the ball tracks moves in the region from the joint center plane EM to the second side S2 radially outwardly relative to said reference radius RB.

In the inner joint part, the center line M23 of the ball tracks moves in the region from the joint center plane EM to the first side S1 radially outwardly relative to said reference radius RB'.

The second solution differs from the first solution wherein the track center lines of pairs of tracks are positioned in radial planes ER through the center axes L12, L13 of the joint in that, in the present case, the center lines of pairs of tracks of each two adjoining balls extend in track planes BE, BE* which are arranged to as to be substantially parallel and symmetrical relative to one another and so as to extend parallel to a radial plane ER. As in the case of the first solution, the radial plane ER is defined by the longitudinal axes L12, L13 when the joint is in the aligned condition. While the track shape is basically the same as in the case of the first solution, the track shapes of the second solution, however, refer to parallel axes PE, PE* which extend parallel to the longitudinal axis and which are positioned in a reference plane EX through the longitudinal axes L12, L13, which reference plane is positioned perpendicularly to the radial plane ER. They also refer to reference centers ME which are positioned on said parallel axes PE, PE* and in the point of intersection of the parallel axes with the joint center plane EM. Joints of the type as described here comprise a number of track pairs which can be divided by two if only one pair of tracks is positioned in each track plane BE, BE*. Such joints comprise a number of track pairs divisible by four if in each of the track planes BE, BE* there are positioned two pairs of tracks which are substantially diametrically opposed to one another and whose shapes are symmetrical relative to one another. The track planes BE, BE* can also form smaller symmetrical angles with the respective radial plane ER.

As mentioned above, the further embodiments—while changing the respective reference planes—substantially correspond to the joint embodiments according to the first solution.

Accordingly, in one embodiment, in the outer joint part, the local radius of curvature R1 of the center line M22 in the joint center plane EM is smaller than the reference radius RB (FIG. 8a). Further, in the inner joint part, the local radius of curvature R1' of the center line M23 in the joint center plane EM is smaller than the reference radius RB' (FIG. 8b).

A further advantageous embodiment provides that in the outer joint part, the center line M22 of the ball tracks extends from the joint center plane EM to the first side S1 radially outside a reference radius RZ whose radius center is positioned in the joint center plane EM on one of the parallel axes PE, PE* (FIG. 8a). Further, in the inner joint part, the center line M23 of the ball tracks extends from the joint center plane EM to the second side S2 radially outside a reference radius RZ' whose radius center is positioned in the joint center plane EM on one of the parallel axes PE, PE* (FIG. 8b).

A further advantageous embodiment provides that in the outer joint part, the center line M22 of the ball tracks extends from the joint center plane EM to the second side S2 radially outside the reference radius RB (FIG. 8a); and in the inner joint part, the center line M23 of the ball tracks extends from the joint center plane EM to the first side S1 radially outside a reference radius RB' (FIG. 8b).

In still a further embodiment, in the outer joint part, the center line M22 of the ball tracks extends from the joint center plane EM to the second side S2 radially inside a reference radius RZ whose radius center ME is positioned in the joint center plane EM on one of the parallel axes PE, PE* (FIG. 8a); and in the inner joint part, the center line M23 of the ball tracks extends from the joint center plane EM to the first side S1 radially inside a reference radius RZ' whose radius center ME' is positioned in the joint center plane EM on one of the parallel axes PE, PE* (FIG. 8b).

In a further embodiment shown in FIGS. 3 and 8, the center lines M22, M23 of the outer ball tracks and inner ball tracks each comprises at least two arched portions which are curved in opposite senses and which adjoin one another in a turning point. The turning points W22 of the outer ball tracks are positioned in a track plane BE, BE* at a distance from the center plane EM towards the second side S2. The turning points W23 of the inner ball tracks are positioned in a track plane BE, BE* at a distance from the center plane EM towards the first side S1. The turning points W22, W23 are each positioned below a maximum of the distance of the center lines M22, M23 from the parallel axes PE, PE*.

A further embodiment provides that the track center lines M22 of the outer ball tracks comprise a first arch with the radius R1 whose center M1 in a track plane BE, BE* is offset by a first axial offset O1a from the center plane EM of the joint towards the first side S1 and by a first radial offset O1r from a parallel axis (PE, PE*) towards the ball track and, in the region adjoining said arch, towards the second side S2, they comprise a second arch with the radius R2 whose center M2 in the track plane BE, BE*, is offset by a second axial offset O2a from the center plane EM of the joint towards the second side S2 and offset outwardly by a second radial offset O2r, which is greater than the sum of the first radius R1 and the first radial offset O1r, from the parallel plane PE, PE* (FIG. 8a). The track center lines M23 of the inner ball tracks comprise a first arch with the radius R1' whose center M1' in a track plane BE, BE* is offset by a first axial offset O1a' from the center plane EM of the joint towards the second side S2 and by a first radial offset O1r' from a parallel axis PE, PE* towards the ball track, and, in the region adjoining said arch, towards the first side S1, they comprise a second arch with the radius R2' whose center M2' in the track plane BE, BE* is offset by a second axial offset O2a' from the center plane EM of the joint towards the first side S1 and offset outwardly by a second radial offset O2r', which is greater than the sum of the first radius R1' and the first radial offset O1r', from the parallel plane PE, PE* (FIG. 8b).

Furthermore, the radius of curvature of the center lines M22 of the outer ball tracks decreases in the extension from the center plane EM to the first side S1, and the radius of curvature of the center lines M23 of the inner ball tracks decreases in the extension from the center plane EM to the second side S2.

More particularly, the track center lines M22 of the outer ball tracks can comprise a third arch with the radius of curvature R3 which, tangentially, while having the same sense of curvature, adjoins the first arch with the radius of curvature R1 and whose radius of curvature R3 is smaller than the radius of curvature R1 (FIG. 9a). The track center lines M23 of the inner ball tracks can also comprise a third arch with the radius of curvature R3' which, tangentially, while having the same sense of curvature, adjoins the first arch with the radius of curvature R1' and whose radius of curvature R3' is smaller than the radius of curvature R1' (FIG. 9b).

According to a further aspect, along the extension of the center line M22 of the outer ball tracks towards the second side S2, the second arch is adjoined by an axis-parallel straight line G3 (FIG. 8a), and along the extension of the center line M23 of the inner ball tracks, the second arch, towards the first side S1, is adjoined by an axis-parallel straight line G3' (FIG. 8b).

According to an alternative embodiment, along the extension of the center line M22 of the outer ball tracks towards the second side S2, the second arch is adjoined by a straight line which approaches the parallel axis PE, PE*, and that along the extension of the center line M23 of the inner ball tracks, the second arch, towards the first side S1, is adjoined by a straight line which approaches the parallel axis PE, PE*.

In the last two examples, the center lines M22, M23 of the ball tracks in the joint center plane EM intersect one another at an angle of 4 to 32°, and the tangents T22', T23' at the track base lines of the ball tracks of all pairs of tracks form identical opening angles α when the joint is in the aligned condition.

In this case, too, the track shape is such that the radial movement (e) of the balls along the ball tracks, over the maximum angular operating angle of $+\beta_{max}/2$, is limited to the value of $e<0.06(\beta_{max})(PCR)$, with $\beta_{max}$ being the maximum angle of articulation of the joint in the arch dimension and PCR being the pitch circle diameter of the joint. It is thus possible to observe a small cage thickness and great track depths. The latter lead to large ball enveloping angles γ22, γ23 and thus to a high torque transmitting capacity of the joint.

A joint of the shape as described here preferably comprises a number of track pairs which can be divided by four. More particularly, the balls of two adjoining pairs of tracks positioned in parallel track planes BE, BE* can be accommodated by a common cage window of the ball cage.

For each of the first and second solutions, it is possible to use two different types of design which are differentiated by exchanging the directions in which the tracks extend between the joint base and the joint aperture of the outer joint part.

According to a first alternative, the first side of the track extension is the attaching side of the outer joint part and the second side of the track extension is the aperture side of the outer joint part. According to a second alternative, the first side is the aperture side of the outer joint part and the second side is the attaching side of the outer joint part.

In principle, it is contemplated to provide the joints in the form of disc joints wherein the first side and the second side define one of the two apertures of the outer joint part one of which is passed through by the shaft leading to the inner joint part, with the other one forming a flanging or fixing face for the outer joint part.

Figure 1A:
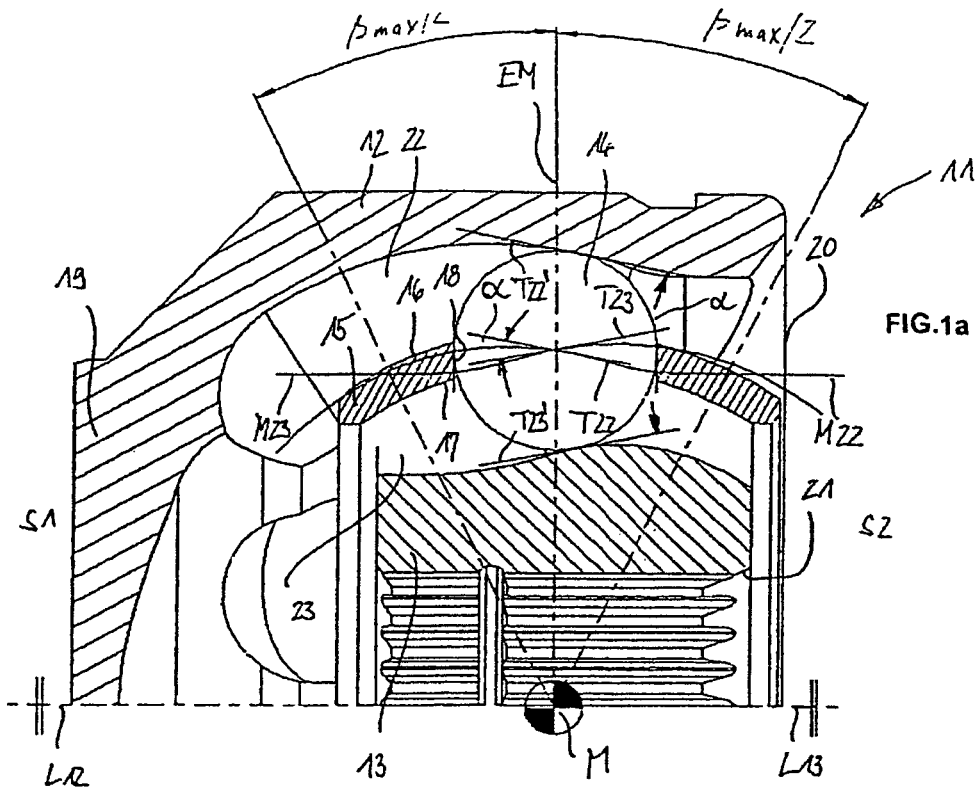
FIG. 1 is an inventive joint in a first embodiment of the first solution:
  a) in half a longitudinal section, and
  b) in half a cross-section.
Figure 1B:
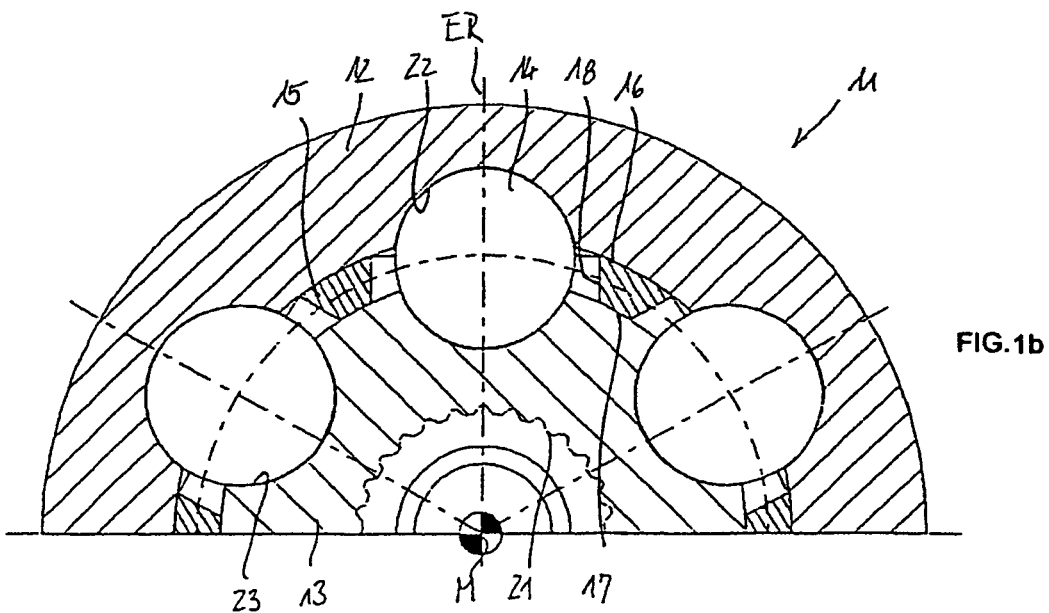

Below FIGS. 1a and 1b will be described jointly. A joint 11 comprises an outer joint part 12, an inner joint part 13, six torque transmitting balls 14 three of which can be seen in the half-section, as well as a ball cage 15. The cage comprises a spherical outer face 16 which is guided in the outer joint part and a spherical inner cage face 17 which is guided on the inner joint part, with said inner cage face contact not being compulsory. The balls 14 are held in circumferentially distributed cage windows 18 in the ball cage 15 in a joint center plane EM. The outer joint part 12 is shown to comprise a longitudinal axis L12 and the inner joint part is shown to comprise a longitudinal axis L13. The point of intersection of the longitudinal axes L12, L13 with the joint center plane EM forms the joint center M. The outer joint part 12 comprises a base 19 which can change into an attaching journal for example, as well as an aperture 20 into which a journal connectable to the inner joint part can be inserted. For this purpose, the inner joint part 13 comprises an insertion aperture 21. Hereafter, the position of the base 19 indicates the axial direction "towards the first side S1" and the position of the aperture 20 hereafter indicates the axial direction "towards the second side S2". Said terms are also used with reference to the inner joint part.

Starting from the center plane EM, the ball contact regions $\beta_{max}/2$ in both directions have been entered for the maximum articulation angle $\beta_{max}$ of the inner joint part 13 relative to the outer joint part 12. The balls 14 are guided in outer ball tacks 22 in the outer joint part and in inner ball tracks 23 in the inner joint part, all six of which are uniformly distributed around the circumference. The balls 14 are in contact with the track base of the ball tracks which does not necessarily have to be given. In the aligned position as indicated, the tangents T22', T23' at the balls 14 in the points of contact with the tracks 22, 23 form an opening angle α which opens towards the attaching end. For describing the ball tracks 22, 23, reference will be made below to the center lines M22, M23 of the ball tracks. In the center plane EM, there are shown tangents T22, T23 at the center lines, which tangents T22, T23 extend parallel to the above-mentioned tangents T22', T23'. The angle α between said tangents T22, T23 ranges between 4 and 32°. If the inner joint part 13 is articulated clockwise relative to the outer joint part 12, the ball 14 shown in the longitudinal section moves towards the right towards the joint aperture 20, and if the inner joint part 13 is articulated anticlockwise relative to the outer joint part 12, the ball 14 shown in the longitudinal section moves towards the left towards the base 19.

Figure 10B:
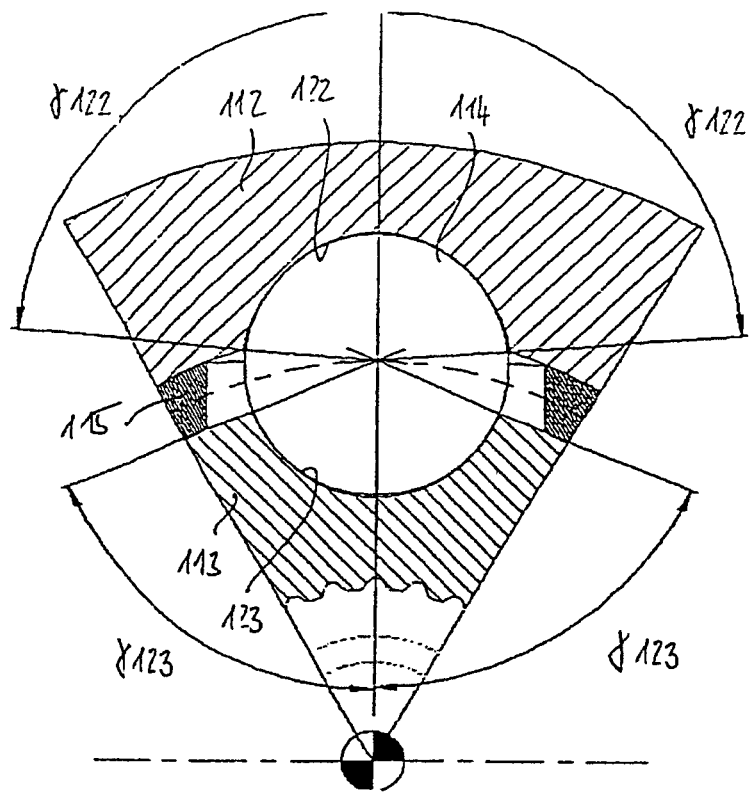
FIG. 10 shows partial cross-sections through a pair of tracks:
  a) of a joint in accordance with the invention, and
  b) of a joint according to the state of the art.
Figure 10A:
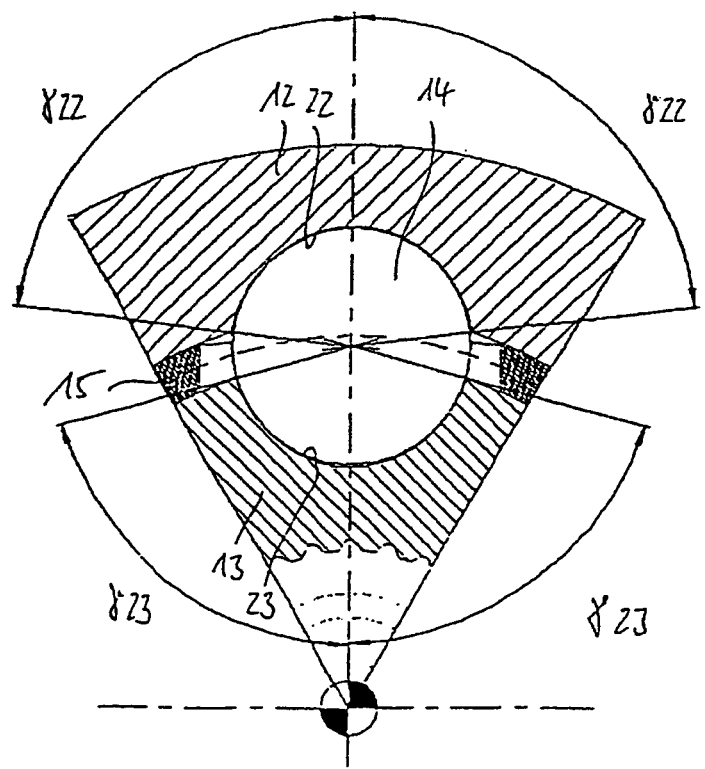

FIGS. 2a and 2b will be described jointly below. They show an inventive joint 11 in the embodiment according to FIG. 1 in two complete illustrations. Identical details have been given the same reference numbers as in FIGS. 1a and 1b. The section shown in FIG. 2b extends in accordance with sectional line A-A of FIG. 2a in the upper half of the illustration through a radial plane R of the joint, which radial plane ER contains the center lines of the pairs of tracks 22, 23, and in the lower half of the picture it extends centrally between two pairs of tracks 22, 23. It can be seen in detail that each pair of tracks with its center lines M22, M23 is positioned in a radial plane ER through the joint, and that said radial planes ER are at identical angular distances from one another and that each ball 14 is accommodated by a cage window 18 in the ball cage 15. Particular attention should be paid to the relatively small radial movement (e) of the ball 14 while moving along the ball tracks in the angular range of $\beta_{max}/2$ (FIGS. 8a, 8b). The radial movement (e) of the ball determines the cage thickness DK and thus the track depth of the ball tracks. A reduced cage thickness DK increases the possible track depth and thus leads to increased enveloping angles γ22, γ23 and thus to an increased load bearing capacity of the balls (FIGS. 10a, 10b). The cage thickness DK in the region of the cage windows 18 preferably amounts to less than 8% of the pitch circle radius PCR, i.e. of the distance between the joint center M and the center of a ball in the point of intersection of the center lines M22, M33 when the joint is in the aligned condition.

Figure 3B:
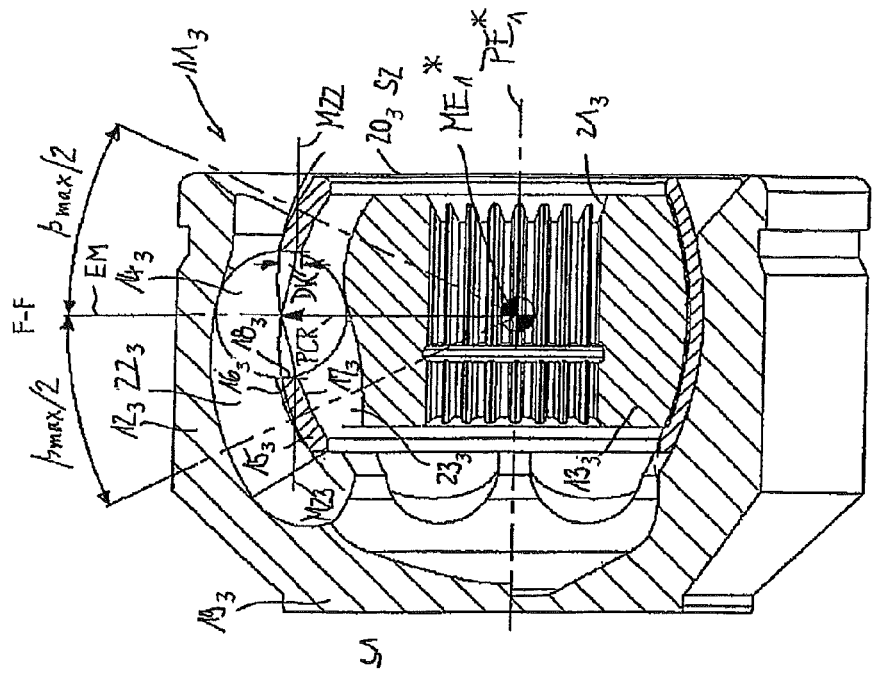
FIG. 3 is an inventive joint in a first embodiment of the second solution:
  a) in an axial view, and
  b) in a longitudinal section.
Figure 3A:
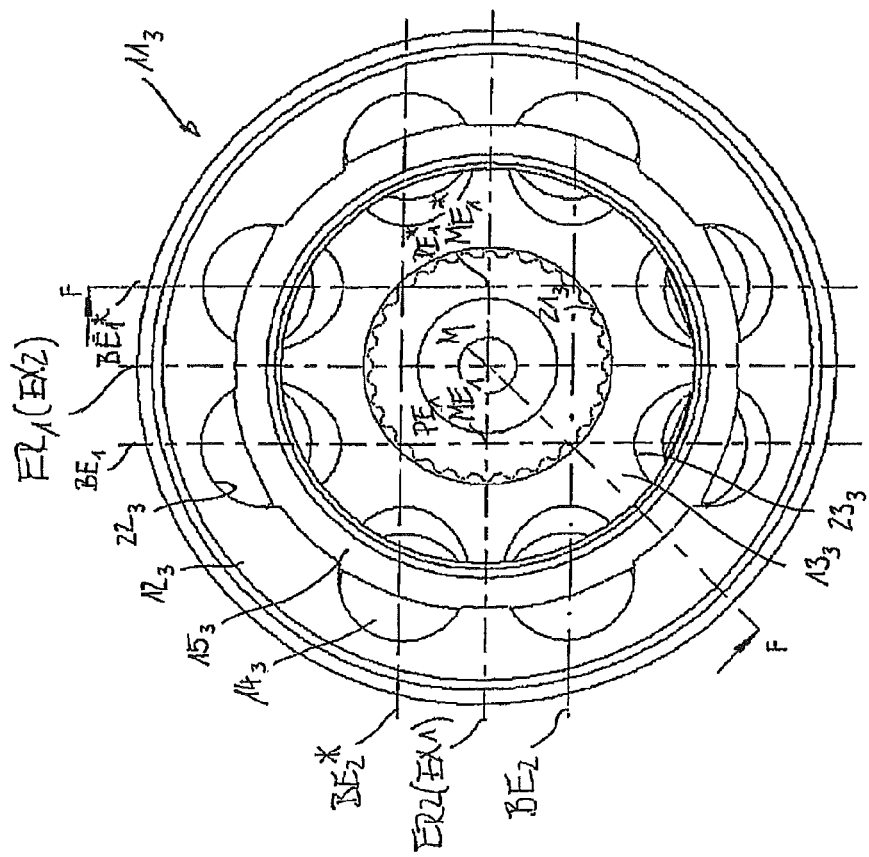

FIGS. 3a and 3b will be described jointly below. They show a joint $11_3$ in an embodiment which has been modified as compared to FIG. 1. Identical details have been given the same reference numbers as in FIGS. 1a and 1b with subscripts "3". The inventive joint 11 in this second embodiment comprises ball tracks $22_3$, $23_3$ which are positioned in track planes BE, BE* which are arranged in pairs and symmetrically relative to the radial planes ER1, ER2 through the joint. FIG. 3b shows an offset section which extends in accordance with the sectional line F-F of FIG. 3a, and which, in the upper half of the illustration, extends through a track plane BE offset in parallel relative to the radial plane ER1 and, in the lower half of the illustration, it extends through a radial plane between two pairs of tracks. All of the center lines M22, M23 of the pairs of tracks extend in the form as shown in FIG. 3b, with the tracks of four pairs of tracks being positioned in track planes BE1, BE1* which are positioned in parallel to and symmetrically relative to a first radial plane ER1. The tracks of four further pairs of tracks are positioned in track planes BE2, BE2* which extend in parallel to and at the same distance from a second radial plane ER2. The track planes contain parallel axes PE, PE* relative to the longitudinal axes at the shortest distance which thus form sectional lines between the track planes and a reference plane EX1, EX2 positioned perpendicularly relative to the respective radial plane ER1, ER2. On the parallel axes PE, PE* there are positioned track center points ME, ME* at the shortest distance from the joint center M. If four pairs of tracks are arranged symmetrically to three or four radial planes ER with the same pitch angle between them, there are obtained joints with twelve or sixteen pairs of tracks $22_3$, $23_3$ and, accordingly, twelve or sixteen balls $14_3$. In this case, too, as above, it is necessary to point out the comparatively thin design of the ball cage $15_3$ whose cage thickness DK in the region of the cage windows $18_3$ is a maximum of 8% of the pitch circle radius PCR, i.e. of the distance between the track center ME and the ball center in the point of intersection of the center lines M22, M33 when the joint is in the aligned position. In accordance with FIG. 3a, the center ME1* shown in FIG. 3a is not the joint center but the track curve center in one of the track planes BE1, BE1*.

Figure 4A:
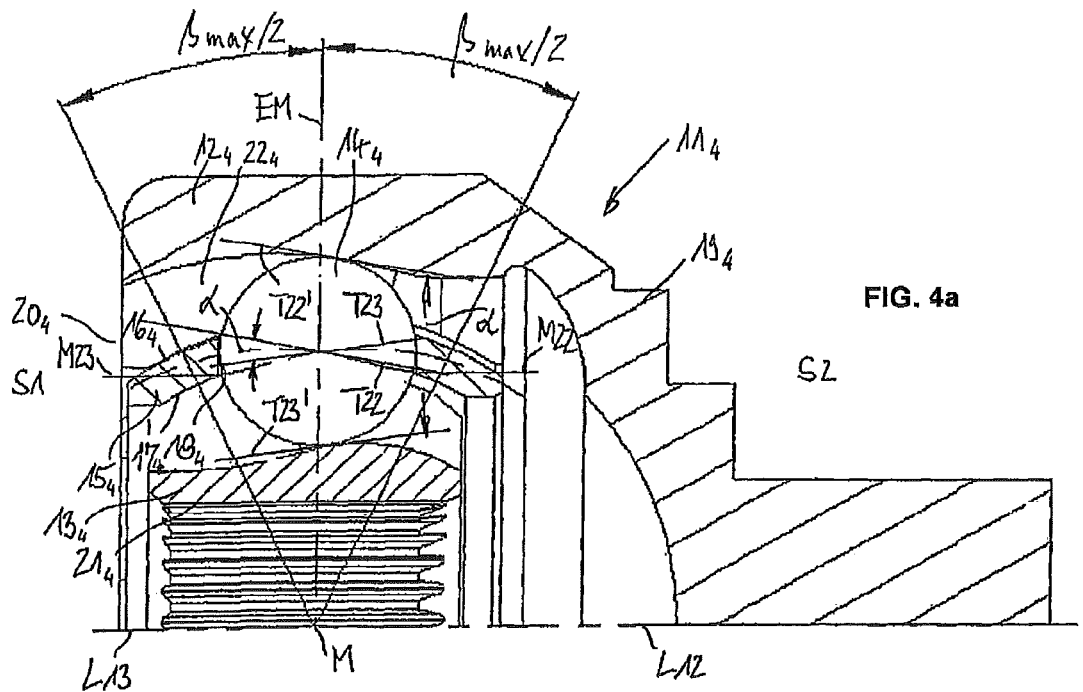
FIG. 4 is an inventive joint in a second embodiment of the first solution:
  a) in half a longitudinal section, and
  b) in half a cross-section.
Figure 4B:
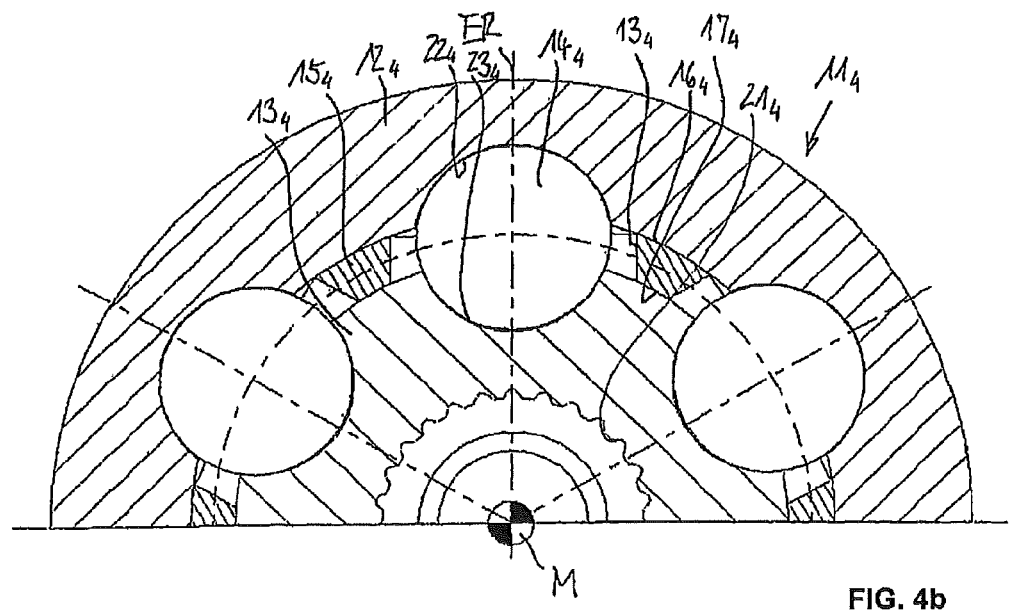

FIGS. 4a and 4b will be described jointly below with reference to FIGS. 1a and 1b. Any details identical to those shown in FIGS. 1a and 1b have been given the same reference numbers with subscript "4", and to that extent, reference is made to the description of FIGS. 1a and 1b. The ball tracks of FIGS. 4a and 4b deviate from those shown in FIGS. 1a and 1b in that they extend in the opposite direction. In the aligned position as illustrated, the tangents T22' and T23' at the balls 14 form an opening angle $\alpha_1$ in the contact points with the tracks $22_4$, $23_4$, which opens towards the base. Therefore, as far as the extension of the ball tracks is concerned, the position of the aperture $20_4$ indicates the first side S1 and the position of the base $19_4$ the second side S2.

Figure 5B:
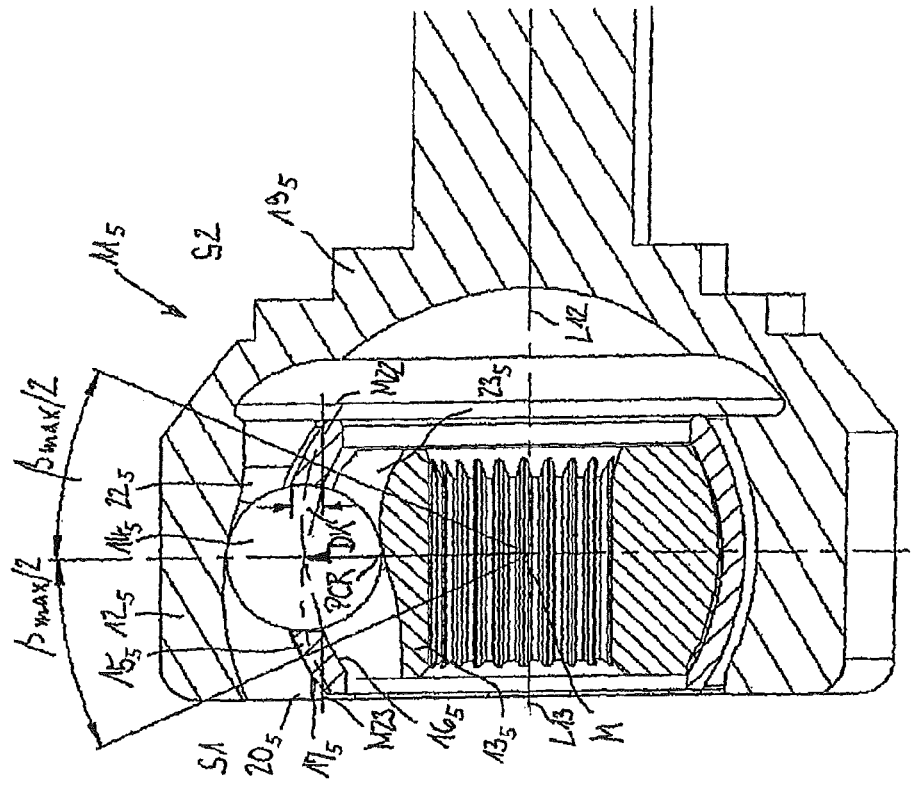
FIG. 5 is an inventive joint according to FIG. 4:
  a) in an axial view, and
  b) in a longitudinal section.
Figure 5A:
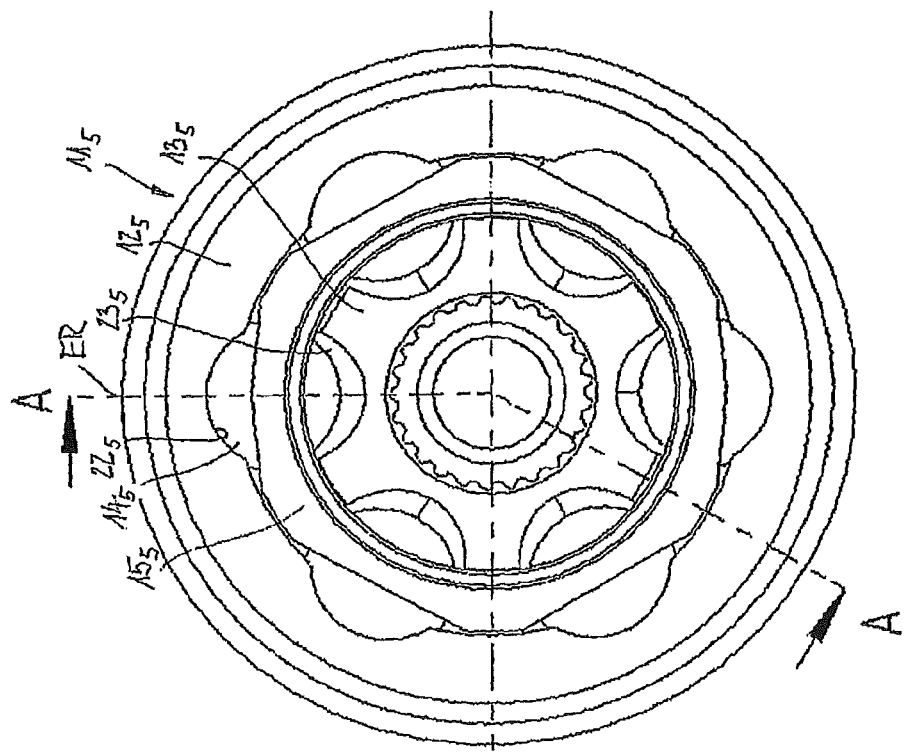

FIGS. 5a and 5b will be described jointly below with reference to FIGS. 2a and 2b. They show an inventive joint $11_5$ in the embodiment according to FIG. 4 in two complete sections. Details identical to those shown in FIGS. 2a and 2b have been given the same reference numbers with subscript "5". The section shown in FIG. 5b extends in accordance with sectional line A-A of FIG. 5a in the upper half of the illustration through a radial plane ER of the joint, which radial plane ER contains the center lines of the pairs of tracks $22_5$, $23_5$, and in the lower half of the picture it extends centrally between two pairs of tracks $22_5$, $23_5$. It can be seen in detail that each pair of tracks with its center lines M22, M23 is positioned in a radial plane ER through the joint, that said radial planes ER are at identical angular distances from one another and that each ball $14_5$ is accommodated by a cage window $18_5$ in the ball cage $15_5$. The relatively small radial movement (e) of the ball $14_5$ while moving along the ball tracks in the angular range of $\beta_{max}/2$ can be noted (FIG. 8a, 8b). The radial movement (e) of the ball determines the cage thickness DK and thus the track depth of the ball tracks. A reduced cage thickness DK increases the possible track depth and thus leads to increased enveloping angles γ22, γ23 and thus to an increased load bearing capacity of the balls (FIGS. 10a, 10b). The cage thickness DK in the region of the cage windows $18_5$ preferably amounts to less than 8% of the pitch circle radius PCR, i.e. of the distance between the joint center M and the center of a ball in the point of intersection of the center lines M22, M33 when the joint is in the aligned condition.

Figure 6B:
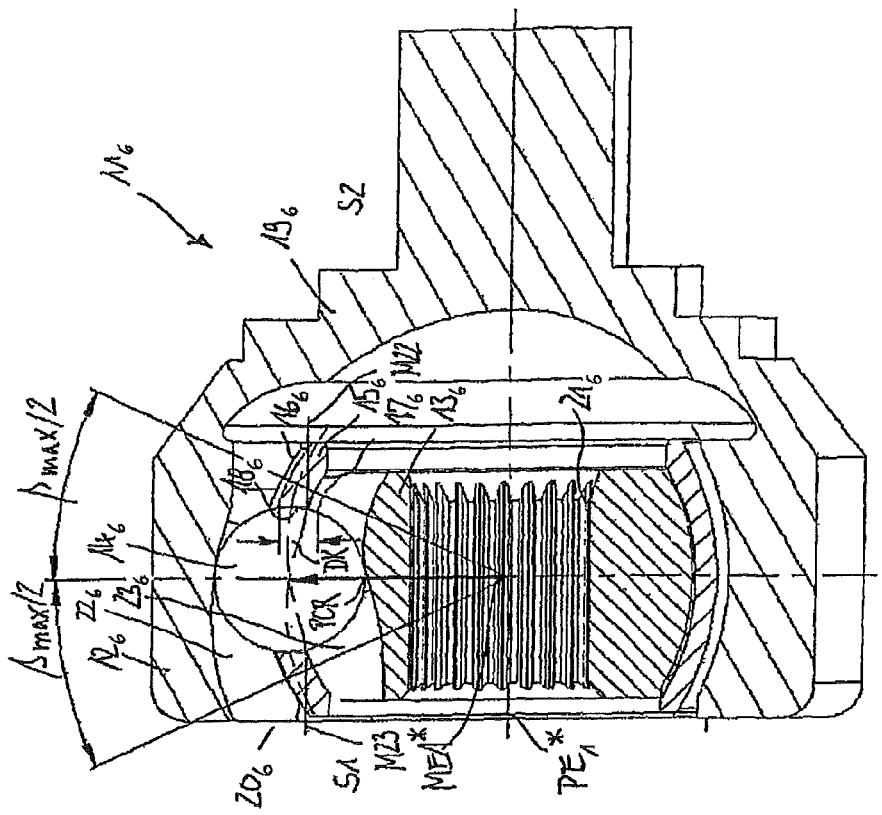
FIG. 6 is an inventive joint in a second embodiment of the second solution:
  a) in an axial view, and
  b) in a longitudinal section
Figure 6A:
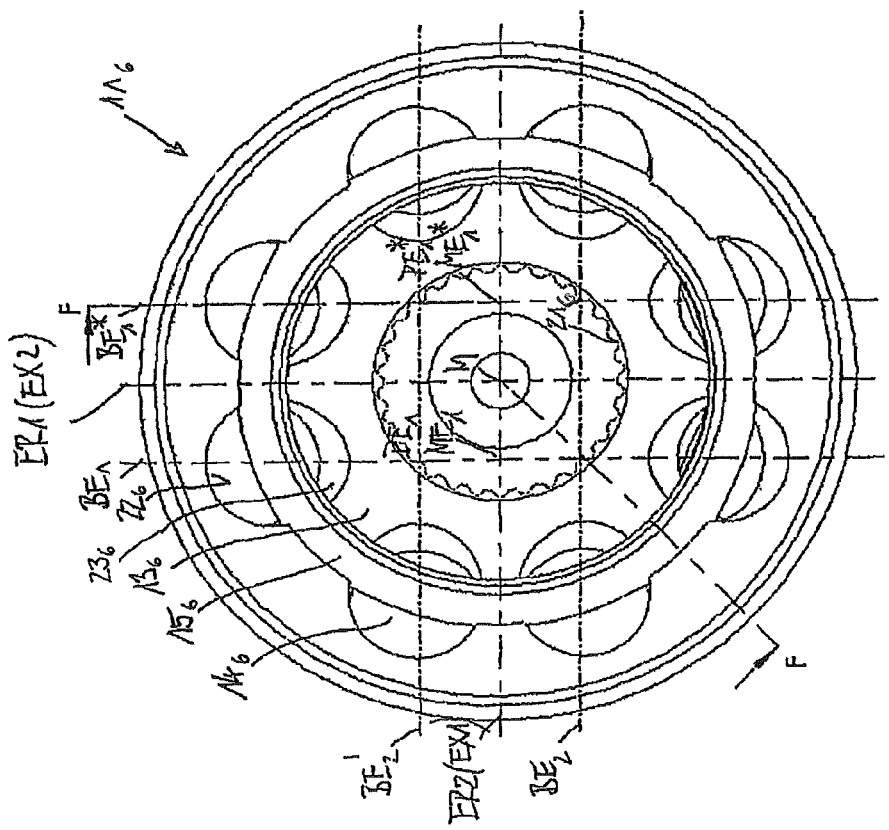

FIGS. 6a and 6b will be described jointly below with reference to FIGS. 3a and 3b. Identical details have been given the same reference numbers with subscript "6". The inventive joint $11_6$ in this second embodiment comprises ball tracks $22_6$, $23_6$ which are positioned in track planes BE, BE* which are arranged in pairs and symmetrically relative to the radial planes ER1, ER2 through the joint. FIG. 6b shows an offset section which extends in accordance with the sectional line F-F of FIG. 6a and which, in the upper half of the illustration, extends through a track plane BE offset in parallel relative to the radial plane ER1 and, in the lower half of the illustration, it extends through a radial plane between two pairs of tracks. All the center lines M22, M23 of the pairs of tracks extend in the form as shown in FIG. 6b, with the tracks of four pairs of tracks being positioned in track planes BE1, BE1* which are positioned in parallel to and symmetrically relative to a first radial plane ER1. The tracks of four further pairs of tracks are positioned in track planes BE2, BE2* which extend in parallel to and at the same distance from a second radial plane ER2. The track planes contain parallel axes PE, PE* relative to the longitudinal axes at the shortest distance which thus form sectional lines between the track planes and a reference plane EX1, EX2 positioned perpendicularly relative to the respective radial plane ER1, ER2. On the parallel axes PE, PE* there are positioned track center points ME, ME* at the shortest distance from the joint center M. If four pairs of tracks are arranged symmetrically to three or four radial planes ER with the same pitch angle between them, there are obtained joints with twelve or sixteen pairs of tracks $22_6$, $23_6$ and, accordingly, twelve or sixteen balls $14_6$. In this case, too, as above, it is necessary to point out the comparatively thin design of the ball cage $15_6$ whose cage thickness DK in the region of the cage windows $18_6$ is a maximum of 8% of the pitch circle radius PCR, i.e. of the distance between the track center ME and the ball center in the point of intersection of the center lines M22, M33 when the joint is in the aligned position. In accordance with FIG. 6a, the center ME1* shown in FIG. 6b is not the joint center but the track curve center in one of the track planes BE1, BE1*.

Figure 7B:
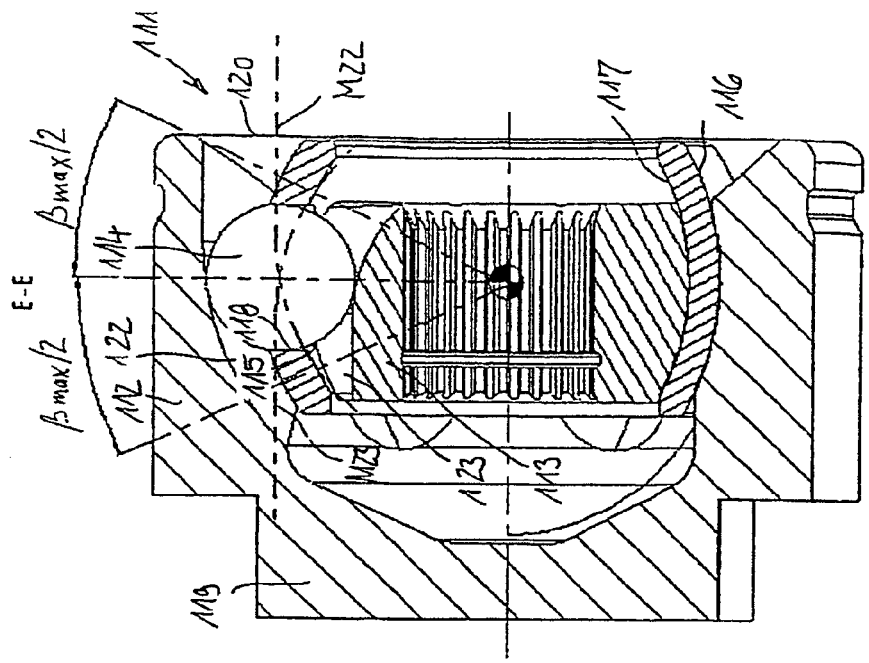
FIG. 7 is a joint according to the state of the art:
  a) in an axial view, and
  b) in a longitudinal section.
Figure 7A:
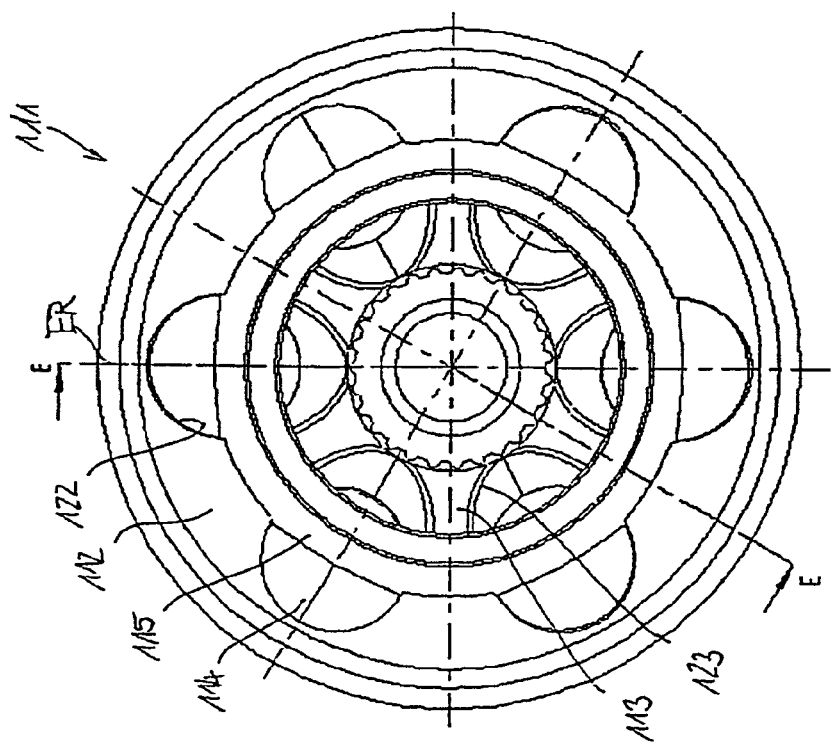

FIGS. 7a and 7b will be described jointly below. They show a UF joint of a prior art design wherein the center lines of the ball tracks extend in radial planes through the joint. Any details identical to those shown in FIGS. 1a and 1b will be given the same reference numbers indexed by 100. In accordance with sectional line E-E in FIG. 7a, FIG. 7b in the upper half of the picture shows a radial section through the center plane of a pair of tracks 122, 123 and in the lower half of the illustration, there is shown the radial section between two pairs of tracks 122, 123. The outer ball tracks 122 and the inner ball tracks 123 of a pair of tracks widen from the base 119 of the outer joint part 112 to the aperture 120 of the outer joint part 112 and, if viewed from the aperture end, they are undercut-free. It is also possible to see the thick-walled shape of the ball cage 115 as compared to the previously shown inventive joints according to FIGS. 2 and 3. The track center lines M122, M123 are composed of a circular arch and a tangentially adjoining straight line.

FIG. 8a shows the track center line M22 of an outer ball track 22 according to any one of FIGS. 1 to 6, which track center line M22 extends parallel to a track base line. The center line M22 of a track in the outer part has a first radius R1 around a center M1 with the first axial offset O1a and a radial offset O1r as well as of a second radius R2 with a second axial offset O2a and a second radial offset O2r. The transition is indicated by a turning point W22. The second radius R2 is tangentially followed by a straight line G3 which extends parallel relative to the axis L12, PE, PE*. The central plane EM is shown to comprise the tangent T22 at the center line M22, which intersects a longitudinal axis L12, PE, PE* at the angle α/2. A perpendicular line on the tangent T22 intersects the longitudinal axis L12, PE; PE* in the reference center MB, MBE of a reference radius RB. A further reference radius RZ is shown around the track center M, ME. To the left of the center plane EM, towards the first side S1, there extends the center line M22 inside the radius RB and outside the radius RZ. To the right of the center plane EM, towards the second side S2, there extends the center line M22 substantially outside the radius RB and inside of the radius RZ. The radial ball movement of a ball on its path along the ball track with reference to the track center M, ME has been given the reference symbol (e). This corresponds to the minimum thickness of the ball cage in the region of the cage window, wherein there is required a safety tolerance to avoid any edge bearing.

FIG. 8b shows the track center lines M23 of the associated inner ball tracks 23 according to any one of FIGS. 1 to 6, which track center lines M23 extend parallel to the track base lines. The center line M23 of a track 23 in the inner joint part 13 has a first radius R1' around a center M1' as well as of a second radius R2' around a center M2'. The transition is indicated by a turning point W23. The second radius R2' is followed by a straight line G3' which extends parallel relative to the axis L13, PE, PE*. The center M1' comprises an axial offset O1a' and a radial offset O1r', and the center M2' comprises an axial offset O2a' and a radial offset O2r'. In the center plane EM, there is shown the tangent T23 at the center line M23 which intersects a longitudinal axis L13, PE, PE* at an angle α/2. A perpendicular line on the tangent T23 intersects the longitudinal axis L13, PE; PE* in the reference center MB', MBE' of a reference radius RB'. A further reference radius RZ' is shown around the track center M, ME. To the right of the center plane EM towards the second side S2, there extends the center line M23 inside the radius RB' and outside the radius RZ'. To the left of the center plane EM towards the first side S1, there extends the center line M23 at least largely outside the radius RB' and inside the radius RZ'. The radial ball movement of a ball on its path along the ball track with reference to the track center M, ME has been given the reference symbol (e). The two center lines M22, M23 of FIGS. 5a, 5b intersect one another in the joint center plane EM at the angle α and extend mirror-image-like relative to said center plane.

FIG. 9a shows the track center line M22 of an outer ball track 22 in a modified embodiment, such track center line M22 extending parallel to a track base line. The center line M22 of a track in the outer joint part has a first radius R1 around a center M1 with the first axial offset O1a and a radial offset O1r as well as of a second radius R2 with a second axial offset O2a and a second radial offset O2r, as well as of a third radius R3 which, in the opposite direction to radius R2, adjoins the radius R1, which is smaller than said radius R1 and is curved in the same direction, with the position of its center M3 not being given detailed dimensions. The transition between the first and the second radius is indicated by the turning point W22. The second radius R2 is tangentially followed by a straight line G3 which extends parallel to the axis L12, PE, PE*. In the center plane EM, there are shown the tangent T22 at the center line M22 which intersects a longitudinal axis L12, PE, PE* at an angle α/2. The perpendicular line on the tangent T22 intersects the longitudinal axis L12, PE; PE* in the reference center MB, MBE of a reference radius RB. A further reference radius has been entered around the track center M, ME. To the left of the center plane, towards the first side S1, there extends the center line M22 inside the radius RB and outside the radius RZ. To the right of the center plane EM, towards the second side S2, there extends the center line M22 largely outside the radius RB. The radial ball movement of a ball on its path along the ball track with reference to the track center line M, ME has been given the reference symbol (e). This corresponds to the minimum thickness of the ball cage in the region of the cage windows, wherein there is required a safety tolerance to avoid edge bearing.

FIG. 9b shows the track center lines M23 of the associated inner ball tracks 23 in a modified embodiment, said track center lines M23 extending parallel to the track base lines. The center line M23 of the track 23 in the inner part 13 has a first radius R1' around a center M1', a second radius R2' around a center M2', as well as a third radius R3' which, in the opposite direction to the radius R2', adjoins the radius R1', which is smaller than the radius R1' and is curved in the same direction. The second radius R2' is followed by a straight line G3' which extends parallel to the axis L13, PE, PE*. The center M1' comprises an axial offset O1a' and a radial offset O2r'. The position of the center M3' has not been given detailed dimensions. In the center plane EM, there is entered the tangent T23 at the center line M23 which intersects the longitudinal axis L13, PE, PE* at the angle α/2. A perpendicular line on the tangent T23 intersects the longitudinal axis L12, PE; PE* in the reference center MB', MBE' of a reference radius RB'. A further reference radius RZ' has been entered around the track center M, ME. To the right of the center plane EM, towards the second side S2, there extends the center line M23 inside the radius RB' and outside the radius RZ'. To the left of the center plane EM, towards the first side S1, there extends the center line M23 largely outside the radius RB'. The radial ball movement of a ball on its path along the ball track with reference to the track center M, ME has been given the reference symbol (e). The two center lines M22, M23 of FIGS. 6a, 6b intersect one another in the joint center plane EM and the angle α and extend mirror-symmetrically relative to said center plane.

FIG. 10 shows the effects of a thin cage 15 in the inventive joint (FIG. 10a) as compared to a joint according to the state of the art (FIG. 10b). The thinner cage 15 in accordance with the invention permits larger track enveloping angles γ22, γ23 in the outer tracks 22 and in the inner tracks 23.

What is claimed is:

1. A constant velocity fixed joint comprising:
   an outer joint part having a longitudinal axis (L12), and a first side (S1) and a second side (S2) arranged so as to be axially opposite one another, and outer ball tracks;
   an inner joint part having a longitudinal axis (L13) and an attaching mechanism for a shaft pointing to an aperture of the outer joint part, and inner ball tracks, the outer ball tracks and the inner ball tracks form pairs of tracks with one another, the pairs of tracks each accommodate a torque transmitting ball; and
   an annular ball cage between the outer joint part and the inner joint part and comprising circumferentially distributed cage windows which each accommodate at least one of the torque transmitting balls,
   the centers of the balls are held by the cage in a joint center plane (EM) and, when the joint is articulated, they are guided onto an angle-bisecting plane between the longitudinal axes (L12, L13),
   center lines (M22, M23) of the outer and inner ball tracks are positioned in pairs of track planes (BE, BE*) which extend substantially symmetrically and parallel relative to radial planes (ER) through the joint,
   wherein an opening angle (α) between tangents (T22', T23') at track base lines which extend parallel to tangents (T22, T23) at the center lines (M22, M23) of the outer and inner ball tracks in the joint center plane (EM), opens from the second side (S2) to the first side (S1) when the joint is in the aligned condition with coinciding longitudinal axes (L12, L13),
   in the outer joint part, in a region from the joint center plane (EM) to the first side (S1), the center line (M22) of the outer ball tracks departs radially inwardly, a first reference radius (RB) whose radius center (MBE) is positioned in a point of intersection of a perpendicular line on the tangent (T22) at the center line (M22) of the outer ball track in the joint center plane (EM) and of a parallel axis (PE, PE*) extending parallel to the outer joint part longitudinal axis (L12) through a track plane (BE, BE*),
   in the inner joint part, in a region from the joint center plane (EM) to the second side (S2), the center line (M23) of the inner ball tracks departs, radially inwardly, a second reference radius (RB') whose radius center (MBE') is positioned in a point of intersection of a perpendicular line on the tangent (T23) at the center line (M23) of the inner ball track in the joint center plane (EM) and of a parallel axis (PE, PE*) extending parallel to the inner joint part longitudinal axis (L13) through a track plane (BE, BE*),
   in the outer joint part, in a region from the joint center plane (EM) to the second side (S2), the center line (M22) of the outer ball tracks moves radially outwardly relative to said first reference radius (RB),
   in the inner joint part, in a region from the joint center plane (EM) to the first side (S1), the center line (M23) of the inner ball tracks moves radially outwardly relative to said second reference radius (RB').

2. A constant velocity joint according to claim 1, wherein in the outer joint part, a local radius of curvature (R1) of the center line (M22) of the outer ball tracks in the joint center plane (EM) is smaller than the first reference radius (RB), and in the inner joint part, a local radius of curvature (R1') of the center line (M23) of the inner ball tracks in the joint center plane (EM) is smaller than the second reference radius (RB').

3. A constant velocity joint according to claim 1, wherein in the outer joint part, the center line (M22) of the outer ball tracks extends from the joint center plane (EM) to the first side (S1) radially outside a third reference radius (RZ) centered in the joint center plane (EM) on one of the parallel axes (PE, PE*) and,
   in the inner joint part, the center line (M23) of the inner ball tracks extends from the joint center plane (EM) to the second side (S2) radially outside a fourth reference radius (RZ') centered in the joint center plane (EM) on one of the parallel axes (PE, PE*).

4. A joint according to claim 1, wherein in the outer joint part, the center line (M22) of the outer ball tracks extends from the joint center plane (EM) to the second side (S2) radially outside the first reference radius (RB), and
   in the inner joint part, the center line (M23) of the inner ball tracks extends from the joint center plane (EM) to the first side (S1) radially outside the second reference radius (RB').

5. A constant velocity joint according to claim 1, wherein in the outer joint part, the center line (M22) of the outer ball tracks extends from the joint plane (EM) to the second side (S2) radially inside a third reference radius (RZ) whose radius center (ME) is positioned in the joint center plane (EM) on one of the parallel axes (PE, PE*) and,
   in the inner joint part, the center line (M23) of the inner ball tracks extends from the joint center plane (EM) to the first side (S1) radially inside a fourth reference radius (RZ') whose radius center (ME') is positioned in the joint center plane (EM) on one of the parallel axes (PE, PE*).

6. A constant velocity joint according to claim 1, wherein the center lines (M22, M23) of the outer and inner ball tracks each comprise at least two arched portions which are curved in opposite directions and which adjoin one another in a turning point, the turning points (W22) of the outer ball tracks are positioned in a track plane (BE, BE*) at a distance from the center plane (EM) towards the second side (S2), the turning points (W23) of the inner ball tracks are positioned in a track plane (BE, BE*) at a distance from the center plane (EM) towards the first side (S1), the turning points (W22, W23) of the outer and inner ball tracks are each positioned below a maximum of a distance of the center lines (M22, M23) from the parallel axes (PE, PE*).

7. A constant velocity joint according to claim 1, wherein the track center lines (M22) of the outer ball tracks comprise a first arch with a radius (R1) whose center (M1) in a track plane (BE, BE*) is offset by a first axial offset (O1a) from the center plane (EM) of the joint towards the first side (S1) and offset outwardly by a first radial offset (O1r) from a parallel axis (PE, PE*) and, in a region adjoining said first arch, towards the second side (S2), the track center lines of the outer ball tracks comprise a second arch with a radius (R2) whose center (M2) in the track plane (BE, BE*), is offset by a second axial offset (O2a) from the center plane (EM) of the joint towards the second side (S2) and offset outwardly by a second radial offset (O2r), which is greater than the sum of the first radius (R1) and the first radial offset (O1r), from the parallel plane (PE, PE*), and wherein the track center lines (M23) of the inner ball tracks comprise a first arch with a radius (R1') whose center (M1') in a track plane (BE, BE*) is offset by a first axial offset (O1a') from the center plane (EM) of the joint towards the second side (S2) and offset outwardly by a first radial offset (O1r') from a parallel axis (PE, PE*), and, in a region adjoining said first arch of the inner ball track center lines, towards the first side (S1), of the inner ball track center lines comprise a second arch with a radius (R2') whose center (M2') in the track plane (BE, BE*) is offset by a second axial offset (O2a') from the center plane (EM) of the joint towards the first side (S1) and outwardly offset by a second radial offset (O2r') associated with the inner ball tracks, which is greater than the sum of the first radius (R1') and the first radial offset (O1r'), from the parallel plane (PE, PE*).

8. A constant velocity joint according to claim 7, wherein the track center lines (M22) of the outer ball tracks comprise a third arch with a radius of curvature (R3) which, tangentially, having the same sense of curvature, adjoins R1, and wherein R3<R1, and the track center lines (M23) of the inner ball tracks comprise a third arch with a radius of curvature (R3') which, tangentially, having the same sense of curvature, adjoins R1', and wherein R3'<R1'.

9. A constant velocity joint according to claim 1, wherein a radius of curvature of the center lines (M22) of the outer ball tracks decreases in its extension from the center plane (EM) to the first side (S1), and a radius of curvature of the center lines (M23) of the inner ball tracks decreases in its extension from the center plane (EM) to the second side (S2).

10. A joint according to claim 1, wherein along an extension of the center line (M22) of the outer ball tracks towards the second side (S2), a second arch is adjoined by an axis-parallel straight line (G3), and along an extension of the center line (M23) of the inner ball tracks, a second arch, towards the first side (S1), is adjoined by an axis-parallel straight line (G3').

11. A joint according to claim 1, wherein along an extension of the center line (M22) of the outer ball tracks towards the second side (S2), a second arch is adjoined by a straight line which approaches the parallel axis (PE, PE*), and along a extension of the center line (M23) of the inner ball tracks (23), a second arch (R2'), towards the first side (S1), is adjoined by a straight line which approaches the parallel axis (PE, PE*).

12. A joint according to claim 1, wherein a radial movement (e) of the balls along the ball tracks, over the entire angular range $\pm\beta_{max}/2$, is limited to:

$e \leq 0.06(\beta_{max})(PCR)$ with $\beta_{max}$ being the maximum operating angle of the joint in the arch dimension and PCR being the pitch circle radius of the joint.

13. A joint according to claim 1, wherein the center lines (M22, M23) of the outer and inner ball tracks in the joint center plane (EM) intersect one another at an angle of 4 to 32°, and wherein the tangents (T22', T23') at the track base lines of the ball tracks of all pairs of tracks form identical opening angles ($\alpha$) when the joint is in the aligned condition.

14. A joint according to claim 1, wherein the number of track pairs is four or a multiple of four.

15. A joint according to claim 1, wherein the balls of two adjoining pairs of tracks positioned in parallel track planes (BE, BE*) are accommodated in a single window of the ball cage.

16. A joint according to claim 1, wherein the first side (S1) is an attaching side of the outer joint part and the second side (S2) is an aperture side of the outer joint part.

\* \* \* \* \*